United States Patent [19]

Cluff

[11] 4,148,301
[45] Apr. 10, 1979

[54] WATER-BORNE ROTATING SOLAR COLLECTING AND STORAGE SYSTEMS

[76] Inventor: C. Brent Cluff, 5525 N. Grande, Tucson, Ariz. 85704

[21] Appl. No.: 836,356

[22] Filed: Sep. 26, 1977

[51] Int. Cl.² ................................................. F24J 3/02
[52] U.S. Cl. .................................................... 126/271
[58] Field of Search ................................. 126/271, 270

[56] References Cited

U.S. PATENT DOCUMENTS

| 1,162,505 | 11/1915 | Nichols | 126/271 |
| 2,803,591 | 8/1957 | Coanda et al. | 126/270 |
| 3,118,437 | 1/1964 | Hunt | 126/270 |
| 3,893,443 | 7/1975 | Smith | 126/271 |
| 3,905,352 | 9/1975 | Jahn | 126/400 |
| 3,924,604 | 12/1975 | Anderson | 126/270 |
| 4,000,734 | 1/1977 | Matlock et al. | 126/271 |

FOREIGN PATENT DOCUMENTS 820705   8/1937   France ................................. 126/271

Primary Examiner—Carroll B. Dority, Jr.
Attorney, Agent, or Firm—Warren F. B. Lindsley

[57] ABSTRACT

A water-borne solar energy collecting and converting system employing an azimuth-tracking, floating platform equipped with reflectors and associated thermal collector tubes.

16 Claims, 14 Drawing Figures

WATER-BORNE ROTATING SOLAR COLLECTING AND STORAGE SYSTEMS

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is made of metal and glass with one or more layers of glass laid over a blackened metal plate. Air spaces are provided between the layers of glass, and air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

A second disadvantage is that the known flat plate collector does not permit the concentration of solar energy at a localized point as needed in order to get temperatures high enough for the conversion of water to steam such as is required in certain solar-to-electrical conversion processes.

DESCRIPTION OF THE PRIOR ART

Parabolic or cylindrical reflectors have been utilized in the past along with sun-tracking mechanisms in connection with various schemes for the collection, conversion and utilization of solar energy. Variations of such equipment are described in U.S. Pat. Nos. 1,162,505; 2,803,591; 3,118,437 and 4,000,734.

Heretofore, heat exchangers or solar energy concentrators, particularly of the type adapted to collect cold or heat, have been constructed either with a series of tubes embedded in a flat black metallic surface or have comprised a curved or semi-cylindrical or parabolic reflectors with a blackened tube mounted at approximately its focal point with U.S. Pat. Nos. 1,946,184 and 3,321,012 being representative thereof. Relative to this latter form of the prior art, fins or vanes have been mounted about the tube in an effort to obtain more efficiency from the unit. The back side of the tube is generally insulated to reduce energy losses.

At best, the prior art solar concentrating collectors have needed an elaborate system of gears and racks or other means to shift or otherwise change the positions of the exchange or collector unit used so that its relative position to the sun will remain constant.

While such prior art inventions do suggest one method or workable approach for tracking the sun, the particular implementations described in these patents have in general fallen short of what is required in a low-cost and practical system.

SUMMARY OF THE INVENTION

In accordance with the invention claimed, an improved solar energy collecting and converting apparatus and system has been provided which is compact and inexpensive by virtue of its unique sun-tracking mechanism which significantly improves the efficiency of both conventional flat plate and concentrating collectors.

It is, therefore, one object of this invention to provide improved solar energy concentrating collectors by placing conventional systems on a floating platform.

Another object of this invention is to use the unique azimuth-tracking provided by the floating platform to allow construction of a new type of compact, low-profile inexpensive solar energy collecting system. This system would employ a water-supported platform for periodically moving a bank of solar collectors mounted thereon in an arcuate path.

A further object of this invention is to provide an inexpensive solar energy collector which achieves maximum energy collection throughout every day of the year by virtue of its effective yet inexpensive solar-tracking mechanism and converter-moving mechanism.

A further object of this invention is to mount an altitude-tracking, parabolic or cylindrical array of solar energy collectors on an azimuth-tracking platform with this dual tracking arrangement being no more complicated than a conventional single tracking system yet providing maximum year around efficiency.

A still further object of this invention is to provide a structure having a plurality of grooves or racks for mounting receiving reflectors or mirrors in the grooves on a platform and arranged to move in unison with the platform with a common stationary fluid heat transfer tube passing through the focal point of each of the collectors, said platform being movable daily through an arcuate path.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
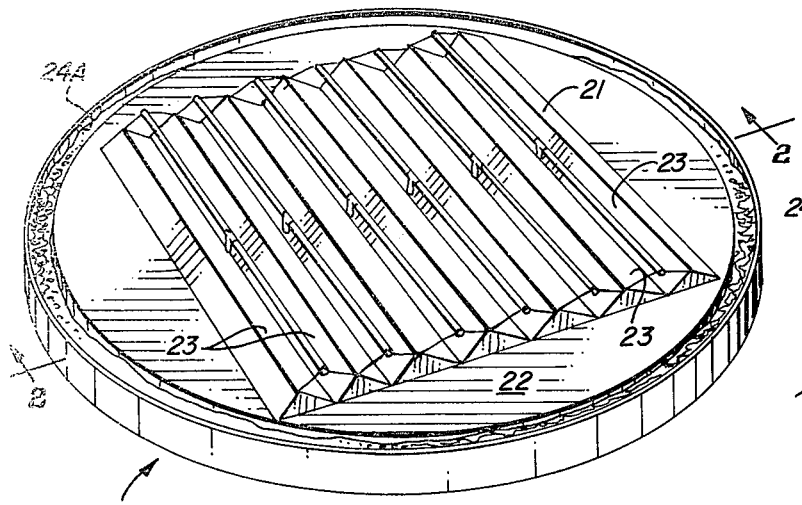
FIG. 1 is a perspective view of a floating platform equipped with a solar energy collector.
Figure 3:
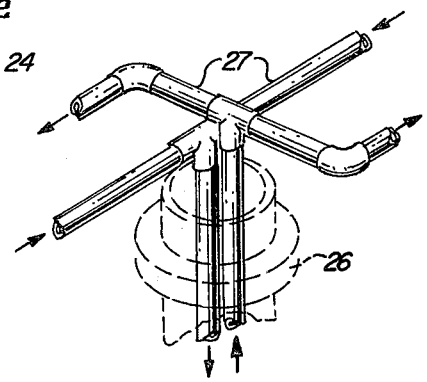
FIG. 3 is a partial perspective view of the center of the floating platform shown in FIG. 1 illustrating the input and output tubing.

Referring more particularly to the drawing by characters of reference, FIGS. 1-10 disclose a solar energy collection and conversion apparatus or system 20 utilizing an array 21 of reflectors supported on a rotating or arcuately movable floating platform 22.

Figure 11:
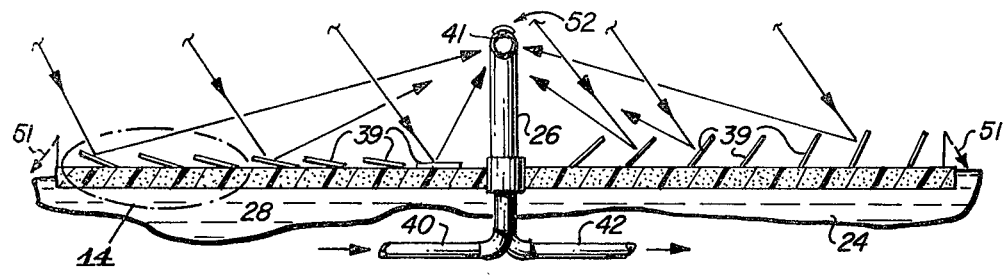
FIG. 11 is a cross-sectional view of a modification of the solar collector and converting apparatus and systems shown in FIGS. 1-10 employing a plurality of reflective surfaces shown at various angles.
Figure 12:
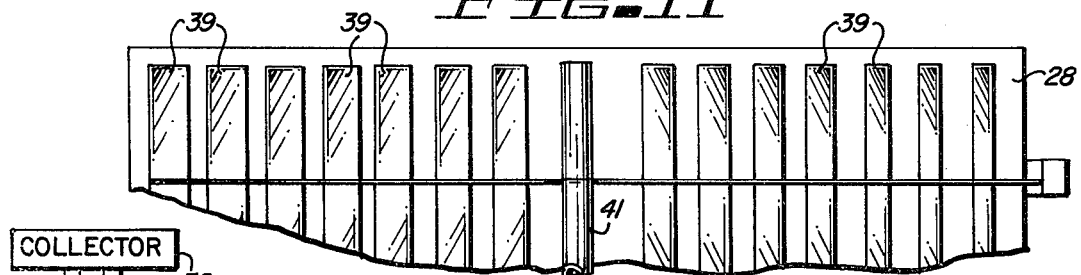
FIG. 12 is a partial top view of the structure shown in FIG. 11.
Figure 13:
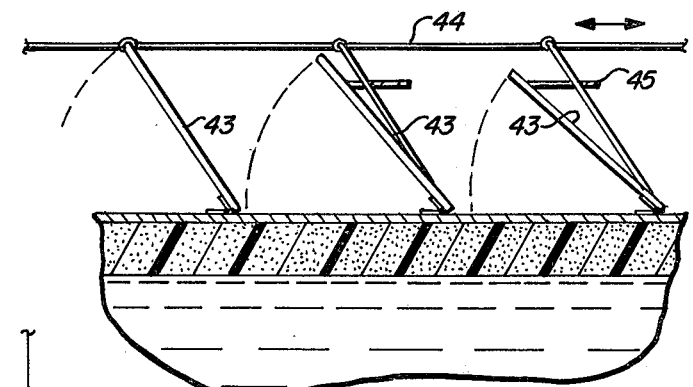
FIG. 13 illustrates details of the mirror mounting and means of moving the reflective surfaces useable in the structure illustrated in FIGS. 11 and 12.
Figure 14:
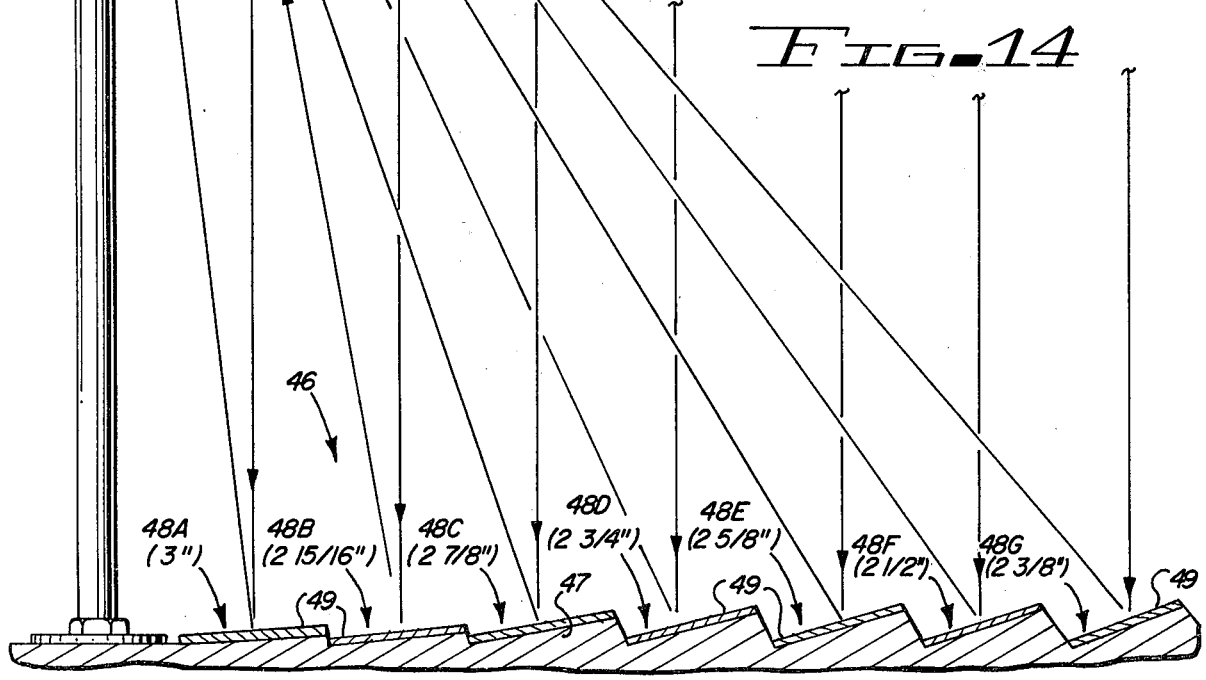
FIG. 14 illustrates details of a fixed mirror floating platform.

The array 21 comprises a multiplicity of trough-shaped reflectors 23 either formed as a part of a unitary structure of the platform, as shown in FIG. 14, or mounted in a frame to be pivotally moved to follow the sun, as shown in FIGS. 11-13.

Figure 7:
FIG. 7 is a cross-sectional view of FIG. 6 taken along the line 7—7.
Figure 8:
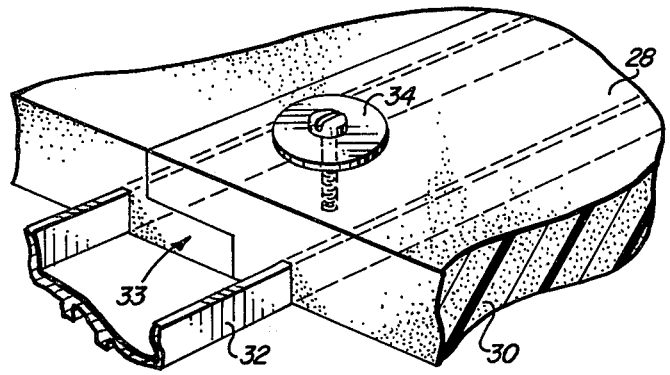
FIG. 8 is a partial perspective view of one of the joints of the platform shown in FIG. 5.
Figure 10:
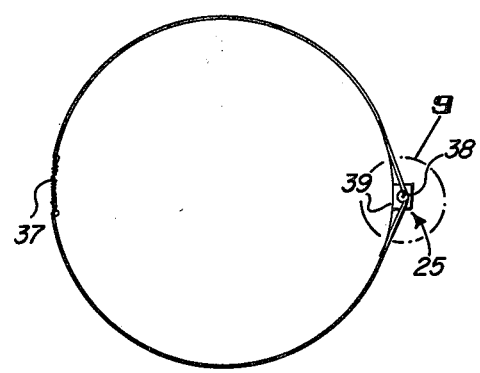
FIG. 10 diagrammatically illustrates the complete tracking mechanism shown in FIG. 9.
Figure 9:
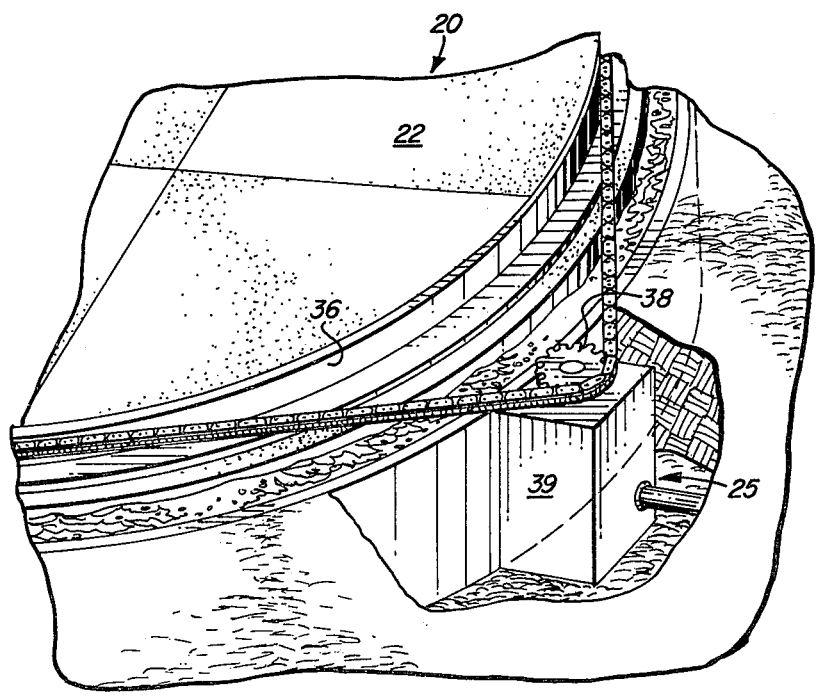
FIG. 9 is a partial perspective view of the reservoir shown in FIGS. 1 and 2 illustrating the tracking mechanism drive.

As shown in FIGS. 1-10, the floating platform 22 may be constructed and placed on a shallow pool of water such as the hypylon-lined pool 24 or it can be placed on any body of water regardless of size. A tracking and platform-moving mechanism 25, 25A shown in FIGS. 1, 9 and 10 is utilized to track the sun and move the platform azimuthally each day.

Figure 2:
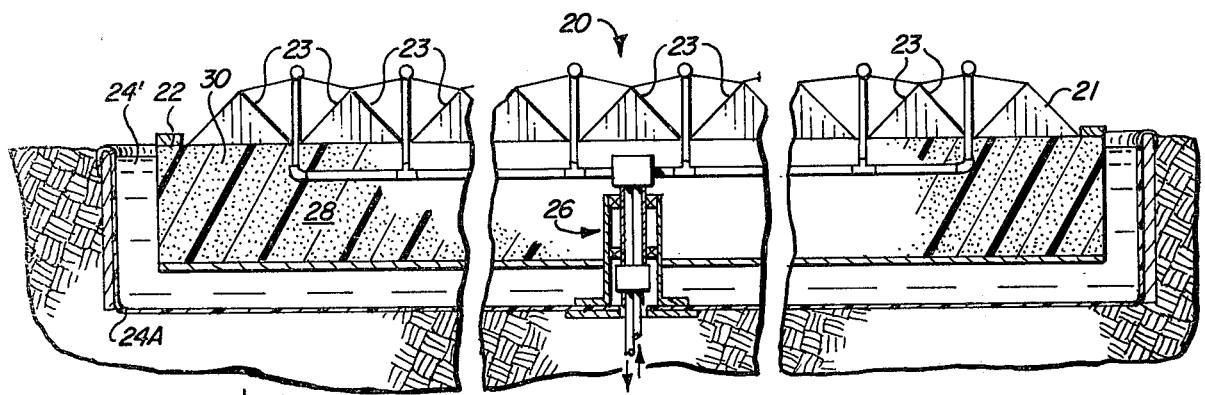
FIG. 2 is a cross-sectional view of FIG. 1 taken along the line 2—2.
Figure 4:
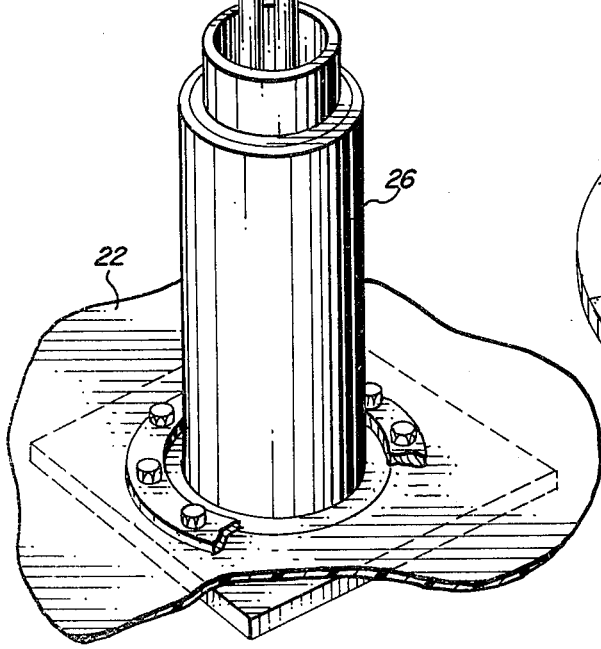
FIG. 4 is an enlarged perspective view of the center post illustrated in FIGS. 1 and 3 showing the reservoir lining of the tank shown in FIG. 1.

Details of the pool and platform are shown in FIGS. 2-7 wherein FIG. 2 illustrates a center pivot point or post 26 which is shown in more detail in FIG. 4. When using a hypylon-lined reservoir, the hypylon lining 24A may be secured to the bottom of the pool in the manner shown. It should be noted that if a four inch hollow post 26 was utilized, the hollow interior would be large enough to permit the installation of flexible tubes 27, shown in FIGS. 2 and 4, which will be connected to the collector array 22.

Figure 5:
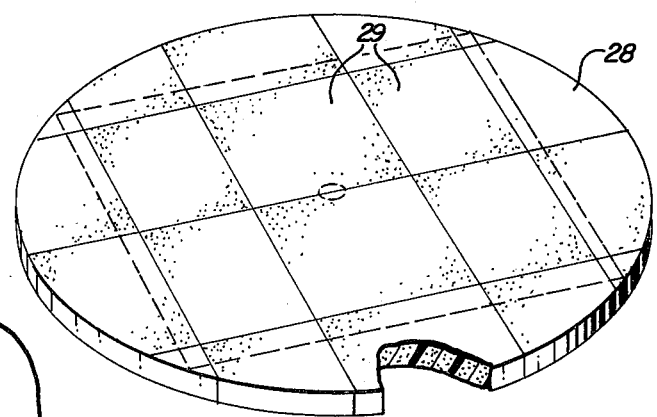
FIG. 5 is a perspective view of the platform shown in FIGS. 1 and 2.
Figure 6:
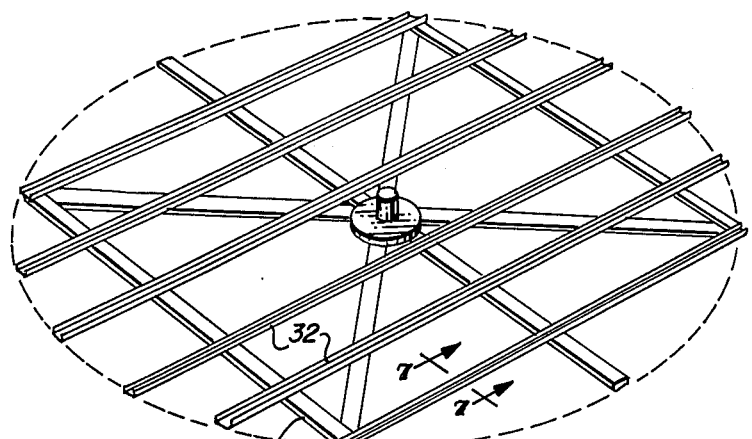
FIG. 6 is a plan view of the aluminum or other suitable sub-frame for the platform shown in FIGS. 1, 2 and 5.

FIGS. 4, 5 and 6 illustrate details of the construction of platform 22. This platform may be formed of any suitable floatable material 28 but is shown for purposes of illustration as being formed, for example, of a plurality of 4 by 8 foot sheets 29 of 2-inch cellular plastic material such as, for example, expanded polystyrene, impregnated in the manner disclosed in co-pending U.S. Pat. application Ser. No. 813,947 filed July 8, 1977 and now U.S. Pat. No. 4,079,170 by C. Brent Cluff and entitled Wax Saturated Expanded Polystyrene and Method of Manufacture. The wax 30 impregnates the foam increasing its density from one up to about 8 pounds per cubic foot. As shown in FIG. 8, the sheets may be assembled in edge-to-edge configuration and lap-joined with hot wax.

The platform is supported on a suitable frame 31 which, as shown in FIGS. 6 and 7, may be formed of any suitable material such as aluminum channel 32 formed in any suitable array to hold the wax-impregnated styrofoam floatable material 28. A modular-type construction might also be used where aluminum-framed panels of foam would be bolted together to form an integral platform.

FIG. 8 illustrates that aluminum channels 32 may overlap the edges of the 4 by 8 foot sheets of the wax-impregnated styrofoam sheets and penetrate the surfaces thereof to hold the sheets in a firm planar manner. As shown more clearly in FIG. 8, the engaging edges of the sheets 29 may be cut to form a tongue and grooved or lap-joined arrangement 33. The sheets of styrofoam then may be pinned together with suitable metal screws and washers 34 after hot wax sealing of the lap joint. Alternatively, a continuous strip of metal or other suitable material can be used to complete the joint.

FIGS. 9 and 10 illustrate one form of tracking mechanism for rotating the platform azimuthally each day and comprises a roller chain 35 mounted to ride around the outside periphery of the top edge 36 of platform 22. The chain 35 is tensioned by a spring 37 and passed around a gear 38 driven by a reversible sun sensor 25A shown in FIG. 1 mounted at a suitable place on the apparatus 10. Another form of tracking would be the use of a pair of opposing propellers or water jets 51 that would be attached near the periphery of the platform that could similarly be activated using a sun sensor, as shown in FIG. 11 by the arrows 51.

The array of reflectors 21, shown in FIG. 1, may comprise either a focusing or flat plate collector arrangement for collecting solar energy and together with platform 22 provides the dual function of not only collecting the sun's energy but also covering the pool of water 24 to prevent evaporation thereof. The storage of collected solar energy can be accomplished with the same or a different body of water, i.e., the source of water floating the platform can be the same water pumped through piping 27 in the focal zone of the reflector, as later explained, or a different and isolated source of water may be utilized for the collection of heat from the reflectors.

One of the basic problems inherent in maximizing the efficiency of any solar collector is that of tracking the sun. This is particularly true of focusing collectors. Flat plate collectors are placed in a fixed position either horizontally or inclined toward the equator. Even though the efficiency of the flat plate collector could be increased significantly, heretofore the costs of providing such a tracking mechanism using known land-supported mechanisms has been prohibitive.

However, the problem of tracking the sun when the collectors are mounted on a floating platform as disclosed herein are greatly reduced. Only a small amount of force is needed whether the raft or platform is floated in a confined pool or on open water.

FIGS. 11, 12 and 13 illustrate an array of reflectors 39 mounted on the floating material 28 around post 26. Incoming relatively cool liquid is pumped through piping 40 into and out of post 26 to one side of the array across the center of the platform to the other side of the array in a stand pipe 41 positioned along a line which will receive the focal rays of the array of reflectors 39 and back along the platform to the return pipe line 42. A suitable pumping system (not shown) is utilized for pumping the liquid through pipes 40, 41 and 42 whether be source of water is the pool 24 which supports platform 22 or any other source.

FIG. 13 illustrates a plurality of mirrors 43 forming the array 39 pivotally mounted on the floating platform 22. The vertical angle or inclination of the reflective surfaces of the array 21 may be easily accomplished. As shown, the mirrors are moved by suitable connecting or control rods 44 and rocker arms 45 moved in response to a sun sensor 45A.

One of the simplifying features of the flat plate mirror focusing on a horizontal collector is that all rows of the mirrors need to be changed by a constant angle once the initial set of each row of mirrors is made. This required adjustment in order to track the sun and keep the sunlight focused on the horizontal tube is $\frac{1}{2}\theta_s$. Thus, for every 15° change in the sun's vertical angle, a 7.5° adjustment in the angle of all the rows of mirrors is needed. The total freedom of movement of the rows of mirrors on each side of the horizontal tube would be 45°. The rear mirrors would start out nearly vertical facing east in the morning, and those in front of the horizontal tube would be nearly horizontal. As the sun's angle increased, the angle of the rear mirrors would be reduced. At the same time, the angle of the front mirrors would be increased. At noon, the angle with regard to the horizontal of the corresponding rows of front and back mirrors would be identical, each row facing the collector tube. The process would be reversed in the afternoon so that the rear mirrors would always be behind the horizontal collection tube. At the end of the day, the rear mirrors would be facing west and again in a near vertical position.

The adjustments in the rows of mirrors can easily be attained through movement of connecting rods that would run perpendicular to the axis of the mirrors. These rods would be connected on rocker arms at an equal distance and the same initial angle from the horizontal. Thus, although the initial set of each row of mirrors is different, the mirror angle can be adjusted by moving the connecting rods an equal amount. The rods could be activated by hydraulic cylinders or small electric motors. The size of the horizontal tube would be determined by the mirror size. Since the required controls to focus the mirrors using this design would be simplified, the size of the mirrors could be kept small enough to reduce wind drag and to lessen the chance of missing the horizontal tube. Mirror widths down to six inches or less should be possible. To minimize damage in heavy wind storms, the mirrors could be flattened as much as possible and the rows turned parallel to the direction of the wind.

To aid in designing the position of or positioning the reflective surfaces in their proper focusing position, the following information is noted.

The angle of the sun, $\theta_s$, can be defined in general terms as follows:

$$\theta_s = \sin\phi \sin d + \cos\phi \cos d \cos h.$$

Where $\theta_s$ = vertical angle of sun above horizontal (also referred to as altitude of the sun).
$\theta_d$ = declination of the sun (this is a function of the time of year).
$\phi$ = latitude of the observer (angular distance from the meridian of the meridian of the observer).
$\theta_h$ = hour angle of sun (angular distance from the meridian of the observer).

The azimuth of the sun, $\theta_{az}$, is measured eastward from the north. This angle is given by:

$$\theta_{az} = -\cos\phi \, dd + \sin\theta_h / \cos\theta_s.$$

Table AI gives the altitude and azimuth of the sun and observed from a meridian at 30° N latitude on June 22 where the declination of the sun is at the maximum of 23° 27'. As indicated in the table, at 6:00 a.m. the sun's altitude is 11.32° and the azimuth is 69.41°. A floating azimuth-altitude track or a fixed mirror azimuth-axial track through-type collector could begin collecting energy at that early hour. A stationary (with regard to horizontal movement) collector, placed in an east-west alignment, could not begin to collect energy at this location until the sun's azimuth was at least 90°, which would occur after 9:00 a.m. This corresponds to a sun altitude of over 49°. The same thing would happen in the afternoon. After 3:00 p.m., the stationary altitude-tracking collector would be inoperative. Thus, in the summer, significant amounts of sunlight cannot be collected with a stationary altitude-tracking concentrating collector. If the altitude-tracking stationary collector was turned with its axis initially north-south, its efficiency in the summer would be maximized but its winter efficiency would be very poor. (These are perhaps the closest competitors among focusing collectors in terms of simplicity to the disclosed concept.)

Table AII gives the altitude and azimuth of the sun as observed from a variation at 30° N latitude on December 22 when the declination of the sun is at the minimum of $-23°$ 27'. In the winter the difference in collection efficiency between this concept and a stationary parabolic or cylindrical collector would not be as significant as the summer since the sun comes up at an azimuth of approximately 120°.

When the sun is at low altitudes there will be some interference between mirrors on the dual tracking system. In order for the mirrors to be fully effective at a given altitude of the sun, the spacing of the mirrors would need to be greater than the width of the mirrors. The optimum spacing is a function of sun altitude, length of mirror and height of the collector tube. The relative cost of the components in the system would also need to be considered as well as the end use of the collected energy. For instance, if the platform cost were greater per unit area than the cost of the collection mirrors it may be the more optimum solution to allow for some interference at lower sun angles. All of these factors can be taken into consideration in an optimization model at a given site.

The flat plate mirrors should be in rows on both sides of and parallel to the horizontal collecting tube. The angle of each row would be adjusted initially according to the following relation:

For mirrors behind horizontal tube (relative to the sun):

$$\theta = 90° - \tfrac{1}{2}(\theta_s + \text{Arctan } y/x)$$

Where $\theta_m$ = the angle of the row of mirrors from the horizontal
$\theta_s$ = angle of solar rays from the horizontal
y = height to center of horizontal collection tube in feet
x = distance of a base of the row of mirrors from the base of the horizontal tube.

For the mirrors located in front (relative to the sun) of the horizontal tube collector the angle of the mirrors is given by:

$$\theta_m = \tfrac{1}{2}(\theta_s - \text{Arctan } y/x)$$

For the initial focusing the same $\theta_s$ would be used. A median value of 45° should be a good initial value to use for $\theta_s$.

FIG. 14 illustrates a fixed flat mirror azimuth-axial tracking solar collector 46 wherein a floating platform 47 may be formed to provide fixed sloping surfaces 48A–48G on which reflective material 49 may be positioned to receive and reflect the sun's rays onto a collecting tube. It should be noted that these surfaces are of different widths to accomplish their purpose. In this type of tracking, the horizontal collector (the "axle") 50 is kept pointed in the direction of the sun. This simple type of concentrating collector is made possible by mounting the system on a floating azimuth-tracking platform.

The fixed mirror, aximuth-axial tracking collector would have the advantage of collecting a higher percentage of sunlight per unit of area utilized because of the closer spacing of its mirrors. The design of this type of collector is also a function of the height of the collector tube above the base of the mirrors and the width of the mirrors. FIG. 14 depicts a design in which a three inch wide collector is mounted 24 inches above a 23.5 inch wide base of the mirrors. The percent of total surface covered with reflective mirrors using this design is approximately 82. This is much higher than is possible using the dual track adjustable mirror approach. Another advantage of the fixed mirror method is that it is more feasible to use narrower mirrors and collector tubes to achieve higher concentration than with the adjustable mirror approach. The major advantage is simplicity and ease of construction. The base indicated in FIG. 14, for example, can be made of wax-saturated expanded polystyrene. The stepped shape can be easily made prior to waxing using end templets which serve as guides for a hot wire. For large construction runs, a mold could be used to produce the shaped foam. The flat mirror strips are then laid on the respective slots. They will stay in place by virtue of their own weight. Bonding them to the surface can be done with molten wax.

The disclosed concept offers virtually unlimited options in construction as far as concentration ratios are concerned. It should be relatively easy to reach up to 500° F. by adjusting this ratio provided care is taken in the design and construction of the collection tube. Construction costs should be much less per unit area using the flat mirrors of this novel concept versus the curved reflector required in cylindrical collectors.

The size of the collectors could be adjusted to meet the heating and cooling requirements of a home or subdivision. A larger unit or units could furnish steam for a conventional power plant. The temperature of the resulting liquid contained in the collection tube would depend on the total size of mirrors as compared with the amount of liquid flowing in the tube.

Instead of the tube, a horizontal collector faced with photovoltaic cells 52 diagrammatically shown by the arrow 52 could be substituted for direct conversion of solar to electrical energy. By concentrating sunlight on the cells, their cost-effectiveness would be greatly increased. In this case, a liquid would be passed through a rectangular tube on which the photovoltaic cells are mounted at a rate high enough to keep the temperature below a specified amount. Then energy contained in this liquid could be put to useful work. Thus, both electrical and thermal energy could be generated at the same time.

Floating collectors could be set up on roofs of large buildings, on the ground near apartment complexes or in subdivisions. The reservoir on which the collector floats could be used as a storage of hot water heating in the winter or cold water for cooling in the summer. The system would be connected to the building, apartments or individual homes through insulated pipelines. In the developed countries, any excess electrical energy could be sold back to the electrical utility in exchange for drawing on the electrical system when the sun was not shining. In areas where no other source of electricity is available, other types of electrical storage such as batteries or pumped storage would have to be used to provide continuous power.

The floating collector has considerable potential when used in conjunction with pumping for irrigation. The collector could be floated on the re-regulation reservoir needed to even out water production at the same time eliminating evaporation. The system should be very appealing to the irrigator, due to its simplicity, particularly if photovoltaic cells are used.

The floating collector can be used on a large scale on existing reservoirs in arid lands, in tideland or marshy areas. The tideland areas of the upper Gulf of California could support thousands of acres of collectors. The Salton Sea or the Great Salt Lake would be other examples where large collectors could be placed. The collector could also be floated in the ocean as long as it was protected against excessive wave action.

The southwest United States and Mexico, as well as other arid lands of the world, contain low-lying land called playas that extend over vast acreages. These are covered with water to a shallow depth during the rainy season but quickly evaporate during the dry season. These areas are essentially bare land with a very low seepage rate. They presently serve no useful purpose but would make excellent floating collector locations. For instance, there is enough sunlight falling on the land surface in the Wilcox Playa in southeastern Arizona to supply southern Arizona, including Tucson, with electrical energy.

Although but a few embodiments of the invention have been illustrated and described, it will be apparent to those skilled in the art that various changes and modifications may be made therein without departing from the spirit of the invention or from the scope of the appended claims.

TABLE AI*

ATTITUDE AND AZIMUTH OF SUN WITH RESULTANT MIRROR ANGLES AT SELECTED SPACINGS ON JUNE 22 AT A MERIDIAN ON THE 30° N LATITUDE.

| TIME | h | $\theta_s$ | $\theta_{az}$ | $\theta_m$** | $\Delta\theta_m$*** | $\Delta\theta_m$ | $\theta_m$**** | $\Delta\theta_m$ |
|---|---|---|---|---|---|---|---|---|
| 5:20 am | −100° | 3.497852° | 64.844362 | 50.269196° | | 77.35037 | 82.5961 | |
| | | | | | 3.9896 | | | 3.9896 | 3.9896 |
| 6:00 am | −90° | 11.476986 | 69.41079 | 46.279628 | | 73.3608 | 78.60654 | |
| | | | | | 6.1947 | | | 6.1947 | 6.1947 |
| 7:00 am | −75° | 23.866416 | 75.697808 | 40.08491 | | 67.16608 | 72.41182 | |

TABLE AI*-continued
ATTITUDE AND AZIMUTH OF SUN WITH RESULTANT MIRROR ANGLES AT SELECTED SPACINGS ON JUNE 22 AT A MERIDIAN ON THE 30° N LATITUDE.

| TIME | h | $\theta_s$ | $\theta_{az}$ | $\theta_m$** | $\Delta\theta_m$*** | $\Delta\theta_m$ | $\theta_m$**** | $\Delta\theta_m$ |
|---|---|---|---|---|---|---|---|---|
| | | | | | 6.3667 | | 6.3667 | | 6.3667 |
| 8:00 am | −60° | 36.59990 | 81.74400 | 33.71817 | | 60.79934 | | 66.0451 | |
| | | | | | 6.4661 | | 6.4661 | | 6.4661 |
| 9:00 am | −45° | 49.532082 | 88.20929 | 27.25208 | | 54.3332 | | 59.57899 | |
| | | | | | 6.4851 | | 6.4851 | | 6.4851 |
| 10:00 am | −30° | 62.50238 | 96.5435 | 20.76693 | | 47.8481 | | 53.09384 | |
| | | | | | 6.3016 | | 6.3016 | | 6.3016 |
| 11:00 am | −15° | 75.10551 | 112.5182 | 14.46536 | | 41.5465 | | 46.7922 | |
| | | | | | 4.1722 | | 4.1722 | | 4.1722 |
| 12:00 Noon | 0 | 83.45000 | 180.000 | 10.29312 | | 37.3742 | | 42.6200 | |

*Design assumptions are rows of mirrors six inches wide focused on a six inch collector located in front of the mirrors with respect to the sun.
**Mirror angle based on a collector tube height of 4 feet and distance of one foot from the base of the collector to the base of the mirrors.
***Mirror angle based on a collector tube height of 4 feet and distance of 10 feet from the base of the collector to the base of the mirrors.
****Mirror angle based on a collector tube height of 4 feet and distance of 20 feet from the base of the collector to the base of the mirrors.

TABLE AII*
ATITUDE AND AZIMUTH OR SUN WITH RESULTANT MIRROR ANGLE AT SELECTED SPACINGS ON JUNE 22 AT A MERIDIAN ON THE 30° N LATITUDE.

| TIME | h | $\theta_s$ | $\theta_{az}$ | $\theta_m$** | $\Delta\theta_m$ | $\theta_m$*** | $\Delta\theta_m$ | $\theta_m$**** | $\Delta\theta$ |
|---|---|---|---|---|---|---|---|---|---|
| 7:20 am | −70° | 4.1725 | 120.1888 | 49.9318 | | 77.0130 | | 82.2587 | |
| | | | | | 3.6318 | | 3.6318 | | 3.6318 |
| 8:00 am | −60° | 11.4361 | 125.8452 | 46.3000 | | 73.3812 | | 78.6270 | |
| | | | | | 4.9187 | | 4.9187 | | 4.9187 |
| 9:00 am | −45° | 21.2735 | 135.882 | 41.3813 | | 68.4625 | | 73.7082 | |
| | | | | | 4.0033 | | 4.0033 | | 4.0033 |
| 10:00 am | −30° | 29.2802 | 148.272 | 37.3780 | | 64.4592 | | 69.7049 | |
| | | | | | 2.6811 | | 2.6811 | | 2.6811 |
| 11:00 am | −15° | 34.6424 | 163.2254 | 34.6969 | | 61.7781 | | 67.0239 | |
| | | | | | 3.6349 | | 3.6349 | | 3.6349 |
| 12:00 Noon | 0 | 36.5500 | 180.000 | 33.7431 | | 60.8243 | | 66.0700 | |

*Design assumptions are rows of mirrors six inches wide focused on a six inch collector located in front of the mirrors with respect to the sun.
**Mirror angle based on a collector tube height of 4 feet and distance of one foot from the base of the collector to the base of the mirrors.
***Mirror angle based on a collector tube height of 4 feet and distance of 10 feet from the base of the collector to the base of the mirrors.
****Mirror angle based on a collector tube height of 4 feet and distance of 20 feet from the base ofthe collector to the base of the mirrors.

What is claimed is:

1. An improved heat exchange means comprising:
   a floating platform,
   an array of juxtapositioned reflectors mounted on the top of said platform,
   each of said reflectors having a reflecting surface,
   means for mounting each of said reflectors in a parallel arrangement on said platform,
   at least one fluid-bearing tube mounted on said platform and extending longitudinally of said reflectors on said platform and approximately disposed with the axis of at least a portion of said tube in the focal zone of at least two of said reflectors, and
   means for moving said platform along said given path to orient and maintain said platform and said reflectors approximately in a plane containing the sun's center,
   whereby the reflection of the sun's rays are concentrated by at least two of said reflectors in a line image along said portions of said tube.

2. The improved heat exchange means set forth in claim 1, including: means for adjusting the vertical angle of said reflectors.

3. The improved heat exchange means set forth in claim 1 wherein:
   said means for mounting each of said reflectors comprises a pivotal mounting means.

4. The improved heat exchange means set forth in claim 3 in further combination with:
   a second means for moving said reflectors independently of said platform in unison through a similar arc.

5. The improved heat exchange means set forth in claim 1 wherein:
   at least a part of said platform comprises an expanded polystyrene.

6. The improved heat exchange means set forth in claim 1 wherein:
   said part of said platform comprises a plurality of sheets secured in a planar arrangement.

7. The improved heat exchange means set forth in claim 6 in further combination with:
   a frame forming a part of said platform for supporting and holding together said sheets and transmitting the stress caused by rotation of said platform.

8. The improved heat exchange means set forth in claim 1 in further combination with:
   a reservoir for containing water for floating said platform in, and wherein:
   said means for positioning said platform for arcuate movement comprises a post secured to the reservoir at a position near its center,
   said platform arcuately moving around said post.

9. The improved heat exchange means set forth in claim 8 wherein:
   the movement of said platform is provided by an electrically powered propeller or water jet attached near the periphery of the platform directing force against the body of water on which the platform floats.

10. The improved heat exchange means set forth in claim 1 wherein:
    said reflectors comprise a plurality of mirrors.

11. The improved heat exchange means set forth in claim 1 wherein:
   at least the planes of some of said reflectors are positioned at various angular positions with the axis of the sun.

12. The improved heat exchange means set forth in claim 4 wherein:
   said reflectors comprise a plurality of mirrors.

13. The improved heat exchange means set forth in claim 12 wherein:
   at least the plane of some of said mirrors are positioned at different angular positions with relation to the axis of the sun.

14. The improved heat exchange means set forth in claim 11 in further combination with:
   means for simultaneously moving said reflectors through a similar arcuate path to maintain them in a given relationship to the sun.

15. The improved heat exchange means set forth in claim 1 wherein:
   the body of water on which the collector floats is also used to store thermal energy.

16. The improved heat exchange means set forth in claim 1 wherein:
   photovoltaic cells are mounted to said tubes which tubes circulate fluid to cool the cells while producing electricity.

* * * * *